(No Model.)
M. M. McGREGOR.
COTTON CHOPPER.
No. 328,595. Patented Oct. 20, 1885.
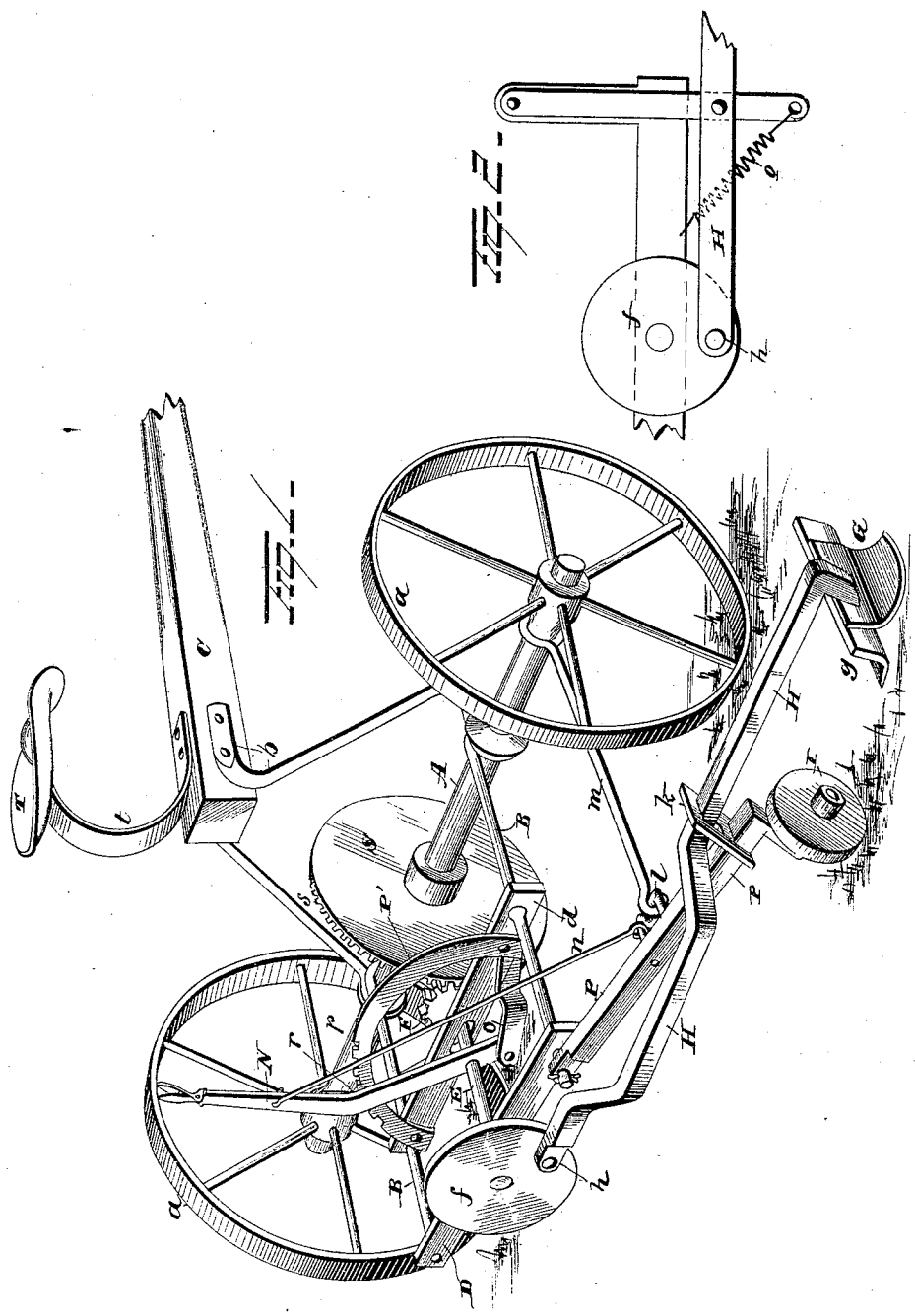
WITNESSES
Geo. F. Downing
S. G. Nottingham
INVENTOR
M M McGregor
By Leggett & Leggett
Attorney

UNITED STATES PATENT OFFICE.

MONTAGUE M. McGREGOR, OF HOUSLEY, TEXAS, ASSIGNOR OF TWO-THIRDS TO AUSTIN MORRIS AND JOHN ANDERSON, OF SAME PLACE.

COTTON-CHOPPER.

SPECIFICATION forming part of Letters Patent No. 328,595, dated October 20, 1885.

Application filed March 17, 1885. Serial No. 159,193. (No model.)

*To all whom it may concern:*

Be it known that I, MONTAGUE M. MC-GREGOR, of Housley, in the county of Dallas and State of Texas, have invented certain new and useful Improvements in Cotton-Choppers; and I do hereby declare the following to be a full, clear, and exact description of the invention, such as will enable others skilled in the art to which it appertains to make and use the same.

My invention relates to an improvement in cotton-choppers, the object of the same being to provide a simple, durable, and effective machine for cutting the stalks, weeds, &c., and for loosening and gathering the soil; and with these ends in view my invention consists in a reciprocating hoe operating transversely to the line of draft.

My invention further consists in the peculiar construction of the truck-frame and in the novel arrangement of the gear for driving and manipulating the hoe.

My invention further consists in certain features of construction and combinations of parts, as will be hereinafter described, and pointed out in the claims.

In the accompanying drawings, Figure 1 is a view of the machine in perspective. Fig. 2 is a modification.

A represents the axle on which the truck-wheels a are mounted. The wheels are mounted rigidly on the axle and the axle caused to rotate therewith in suitable bearings formed in or on the main frame.

The main frame is preferably rectangular, and consists of the side bars, B, which extend a suitable distance to the rear of the axle A, and, after taking a turn about the axle, curve upwardly and forwardly, forming the hounds b, between which the rear end of the tongue C is rigidly secured. The side bars, B, are connected at their rear ends and at points about midway between their rear ends and the axle A by cross-girders D and d, respectively. The side bars, B, may consist of round iron bars or rods and curved about the axle A, as shown, forming loops in which the axle is allowed a free rotary motion; and this construction is simple and inexpensive; but I do not wish to limit myself to this, as bars of other shapes in cross-section may be advantageously employed, and the bearings for the axle formed in other ways than by the loops shown.

A shaft, E, parallel to the line of draft, is journaled in the girders D d, and provided on its forward end with a pinion, F, rigidly secured thereon.

g is the hoe, provided on its back with the curved flange G, for regulating the depth of cut, and rigidly or yieldingly secured to one end of its handle or operating-bar H. The opposite end of the handle is loosely secured on a wrist-pin, h, set in the crank-wheel f, and the handle or operating-bar is bent out of the plane of the crank-wheel f to clear the guide mechanism, which will be hereinafter explained; or the handle may be constructed straight and a modified form of guide be employed, as will appear further on.

A straight bar, P, is secured to the rear corner of the main frame in a free vertically-rocking adjustment, and is provided at its end toward the hoe with a disk or wheel, I, loosely mounted thereon. The bar P is further provided near the disk I with an upwardly-extending loop, k, which loosely embraces the handle or operating-bar H, and allows the latter to slide freely therein. The bar P is further provided near the main frame with an eyebolt or other suitable fastening, l, by means of which it is connected with the axle A and the hand-lever N by a link or rod, m, and a rod, n, respectively.

In the place of the guide wheel or disk I and loop k the bar P may be provided with a slot on its rear face, through which the handle H, now constructed straight, extends, the vibrations of the bar P on its pivotal point at the rear of the main frame serving to elevate and depress the hoe as the crank-wheel f revolves. The bar P may also be pivotally connected with the handle H, dispensing with the slot, loop, and wheel or disk.

A spiral spring, o, might be introduced beneath the bar P, connecting it with the main frame, the tension being exerted to determine the force of the downward stroke of the hoe.

The lever N is pivoted to a depending arm or bracket, O, secured to the girder d, and loosely embraces the shaft E a short distance above its pivotal point.

A sector-bar, P', is secured at each end to the girder d, and is provided with notches or perforations p, adapted to engage a dog, r, on the lever N and lock the lever in the desired rotary adjustment thereto.

The bearing which the shaft E has in the girder d is elongated to admit of the lateral movement of the shaft therein sufficient to throw the pinion F into and out of engagement with the gear-wheel S. The wheel S is mounted rigidly on the axle A, and is provided at its edge with annular gear s, adapted to mesh with the pinion F.

The driver's seat T is attached to a spring-standard, t, secured on the rear end of the tongue.

As the machine is drawn forward the rotation of the wheels, and hence of the axle A, is communicated to the crank-wheel f through the gear S and F and shaft E. The rotation of the wheel f reciprocates the hoe transversely to the line of draft, and thereby cuts the stalks and draws the soil up to the row left standing.

The operating-lever N is located within convenient reach of the driver, and serves to simultaneously elevate the hoe and throw the pinion F out of gear with the wheel S, or the opposite, as it is moved toward the left or right of the machine.

It is evident that many slight modifications in the form and arrangement of the several parts might be resorted to without departing from the spirit and scope of my invention; hence I do not wish to limit myself strictly to the construction herein set forth; but, Having fully described my invention, what I claim as new, and desire to secure by Letters Patent, is—

1. The combination, with a pair of wheels and a main frame mounted loosely thereon, of a shaft journaled therein carrying a pinion and crank-wheel, a hoe adapted to be reciprocated by the crank-wheel, and an operating-lever connected with the shaft and hoe-handle, whereby the shaft is moved laterally and the hoe elevated simultaneously therewith, for the purpose substantially as set forth.

2. In a cotton-chopper, the combination, with a suitable frame, driving-gear, and a hoe adapted to be actuated thereby, of a lever connected with the hoe and driving-shaft adapted to simultaneously throw the shaft out of gear and elevate the hoe, substantially as set forth.

3. In a cotton-chopper, a lever adapted to simultaneously throw the hoe-actuating mechanism out of gear and elevate the hoe, substantially as set forth.

4. In a cotton-chopper, the combination, with a pair of truck-wheels, of a main supporting-frame loosely mounted thereon, consisting, essentially, of a pair of side bars which extend rearwardly from the axle, form a loop about the axle, and extend upwardly and forwardly therefrom, forming the hounds, and two cross-girders connecting the rear extension of the sides, substantially as set forth.

In testimony whereof I have signed this specification in the presence of two subscribing witnesses.

MONTAGUE M. McGREGOR.

Witnesses:
D. W. HOUSLEY,
D. F. GIBSON.